(12) United States Patent
Suzuki et al.

(10) Patent No.: US 8,170,199 B2
(45) Date of Patent: May 1, 2012

(54) ECHO CANCELLER

(75) Inventors: Masanao Suzuki, Kawasaki (JP);
Takeshi Otani, Kawasaki (JP);
Masakiyo Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1115 days.

(21) Appl. No.: 11/840,338

(22) Filed: Aug. 17, 2007

(65) Prior Publication Data
US 2007/0280473 A1 Dec. 6, 2007

Related U.S. Application Data

(63) Continuation of application No. PCT/JP2005/002689, filed on Feb. 21, 2005.

(51) Int. Cl.
*H04M 9/08* (2006.01)
*H04B 3/20* (2006.01)
*H04B 1/38* (2006.01)
*H04B 1/10* (2006.01)
*H03D 3/24* (2006.01)

(52) U.S. Cl. ............. 379/406.01; 379/406.13; 370/286; 455/570; 375/350; 375/375

(58) Field of Classification Search ............. 379/392, 379/406.01, 406.05–406.08, 406.12, 406.14, 379/410, 411, 420; 455/558, 556; 700/67, 700/34, 46
See application file for complete search history.

(56) References Cited

U.S. PATENT DOCUMENTS

| | | | | |
|---|---|---|---|---|
| 4,411,006 A * | 10/1983 | Horna | ............................. | 375/349 |
| 6,563,802 B2 * | 5/2003 | Hayward | ....................... | 370/286 |
| 6,700,977 B2 | 3/2004 | Sugiyama | | |
| 6,754,295 B1 * | 6/2004 | Hartnett | ........................ | 375/356 |
| 6,834,108 B1 | 12/2004 | Schmidt | | |
| 7,120,259 B1 * | 10/2006 | Ballantyne et al. | ........ | 381/71.12 |
| 2002/0101981 A1 | 8/2002 | Sugiyama | | |
| 2003/0149495 A1 * | 8/2003 | Hodges | ............................ | 700/67 |
| 2004/0042616 A1 * | 3/2004 | Matsuo | ..................... | 379/406.01 |
| 2004/0184519 A1 * | 9/2004 | Melsa et al. | ................... | 375/222 |

FOREIGN PATENT DOCUMENTS

| | | |
|---|---|---|
| JP | 11-4183 | 1/1999 |
| JP | 11-331046 | 11/1999 |
| JP | 2002-503923 | 2/2002 |
| JP | 2003-517782 | 5/2003 |
| JP | 2004-88647 | 3/2004 |
| WO | 01/45375 | 6/2001 |

OTHER PUBLICATIONS

Notification of Reason for Rejection dated Dec. 15, 2009, from the corresponding Japanese Application.
Supplementary European Search Report dated Jun. 17, 2008, from the corresponding European Application.
International Search Report dated Jun. 7, 2005, from the corresponding International Application.

* cited by examiner

*Primary Examiner* — Fan Tsang
*Assistant Examiner* — Jeffrey Lytle
(74) *Attorney, Agent, or Firm* — Katten Muchin Rosenman LLP

(57) ABSTRACT

In a speech communication device capable of bidirectional communication, a clock deviation between the speaker side (the receiving side) and the microphone side (the transmitting side) is detected, and based on the above deviation, either a first frequency signal (speaker signal (reference signal)) or a second frequency signal (microphone signal) is frequency-shifted in the frequency domain, and therefore, an influence caused by the clock deviation can simply be corrected without an increased processing amount, and thus, an echo can be suppressed effectively.

6 Claims, 7 Drawing Sheets

ECHO CANCELLER

CROSS REFERENCE TO RELATED APPLICATIONS

This application is a continuation of International Application No. PCT/JP 2005/002689, filed on Feb. 21, 2005, now pending, herein incorporated by reference.

TECHNICAL FIELD OF THE INVENTION

The present invention relates to an echo canceller for suppressing an echo produced by inputting into a microphone a voice signal output from a speaker, and more particularly, an echo canceller capable of effectively suppressing an echo even when an echo frequency is varied due to a clock deviation in between a D/A converter on the speaker side and an A/D converter on the microphone side.

BACKGROUND ARTS

With the spread of IP networks, a telephone service using IP (VOIP) is becoming widespread, which is expected to apply to a TV conference and a voice conference. Because conversation is made among a multiplicity of persons in the TV conference and the voice conference, generally, a hands-free communication function enabling conversation with hands free is essential. However, there arises a problem of acoustic echo such that a sound regenerated by a speaker is recorded through a microphone and undesirably heard by the opposite party.

FIG. 1 is a diagram illustrating hands-free speech communication. In the speech communication between an opposite terminal 10, which is a hands-free speech communication device, and a self-terminal 20, the voice recorded through a microphone 11 of the opposite terminal 10 is regenerated and output from a speaker 22 of self-terminal 20, and the voice recorded through a microphone 21 of self-terminal 20 is regenerated and output from a speaker 12 of the opposite terminal 10. At this time, there arises the problem of an acoustic echo, in which the voice being output, for example, from speaker 22 of self-terminal 20 is recorded through microphone 21, and undesirably output from speaker 12 of the opposite terminal 10. For this reason, each speech communication device (terminal 10, 20) has an incorporated echo canceller 23 for preventing such the acoustic echo. Here, in FIG. 1, the illustration of an echo canceller in the opposite terminal 10 is omitted.

FIG. 2 is a diagram illustrating the principle of the echo canceller. The echo canceller examines the correlation of the frequency spectra between a speaker signal (reference signal) and a microphone signal including an echo for each frequency band, and when the correlation is large, the echo is decided to be large, so that an echo suppression amount is increased. To the contrary, when the correlation is small, the echo is decided to be small, so that the echo suppression amount is decreased. The above process is performed for the entire frequency bands, and according to the magnitude of the correlation, the echo is suppressed.

Patent document 1: Japanese Patent Application Laid-open No. Hei-11-331046.
Patent document 2: Japanese Published Patent Application No. 2003-517782.

DISCLOSURE OF THE INVENTION

Problems to be Solved by the Invention

However, when using the echo canceller, there is a problem that the echo cannot be suppressed if the sampling frequencies between the microphone signal including the echo and the speaker signal (reference signal) are different. The reason is that in PC and PDA presently sold in the commercial market, the sampling frequencies on the recording side and the regeneration side do not always match, and the both sampling frequencies deviate on the order of a few percent, as an example.

FIG. 3 is a diagram illustrating a case that an echo is not suppressed because of the deviation of the sampling frequencies. As shown in FIG. 3(a), for example, in case that the sampling frequency on the recording side (microphone side) (for example, 10 kHz) is greater than the sampling frequency on the regeneration side (speaker side) (for example, 8 kHz), when an echo having a frequency f0 (which is an identical frequency to a speaker signal) when regenerated by the speaker is input into a microphone and recorded, because of the deviation of the sampling frequency, the echo is changed to have a frequency of f0+Δ, as a result of a shift to the higher frequency. When the echo frequency is shifted, as shown in FIG. 3(b), the correlation between the speaker signal and the echo becomes small, and the suppression amount is decreased, and accordingly, the echo cannot be suppressed sufficiently.

As such, in the conventional echo canceller, when the sampling frequency on the recording (microphone) side deviates from the sampling frequency on the regeneration (speaker) side, there is a problem that the correlation between the reference signal (speaker signal) and the echo is decreased because of the deviation of the echo frequencies before regeneration and after recording, and therefore, the echo cannot be suppressed sufficiently.

Accordingly, considering the above-mentioned problem, it is an object of the present invention to provide an echo canceller capable of suppressing an echo even when the sampling frequencies on the regeneration side (speaker side) and the recording side (microphone side) deviate.

Means to Solve the Problems

As a first echo canceller according to the present invention to achieve the aforementioned object, the echo canceller for suppressing an echo produced by inputting into a microphone a voice signal being output from a speaker includes: a detection means for detecting a deviation between a first sampling period of a digital-to-analog converter for converting a received first digital voice signal to an analog voice signal, so as to output from the speaker, and a second sampling period of an analog-to-digital converter for converting an analog voice signal being input into the microphone to a second digital voice signal; a first conversion means for converting the first digital voice signal to a first frequency signal; a second conversion means for converting the second digital voice signal to a second frequency signal; a frequency shift means for frequency-shifting the first frequency signal based on the deviation detected by the detection means; a correlation calculation means for obtaining a correlation between the second frequency signal and the first frequency signal frequency-shifted by the frequency shift means; and an echo suppression means for suppressing the echo included in the second frequency signal, based on the above correlation.

As a second echo canceller according to the present invention, the echo canceller for suppressing an echo produced by inputting into a microphone a voice signal being output from a speaker includes: a detection means for detecting a deviation between a first sampling period of a digital-to-analog converter for converting a received first digital voice signal to an analog voice signal, so as to output from the speaker, and a second sampling period of an analog-to-digital converter for converting an analog voice signal being input into the microphone to a second digital voice signal; a first conversion means for converting the first digital voice signal to a first frequency signal; a second conversion means for converting the second digital voice signal to a second frequency signal; a frequency shift means for frequency-shifting the second frequency signal based on the deviation detected by the detection means; a correlation calculation means for obtaining a correlation between the first frequency signal and the second frequency signal frequency-shifted by the frequency shift means; and an echo suppression means for suppressing the echo included in the second frequency signal, based on the above correlation.

In the above-mentioned first or the second echo canceller, preferably, the echo suppression means suppresses the echo by estimating the frequency spectrum of the echo based on the above correlation, and by subtracting the frequency spectrum of the echo from the second frequency signal.

Alternatively, in the aforementioned first or the second echo canceller, preferably, the echo suppression means suppresses the echo by obtaining a gain corresponding to the suppression amount of the echo based on the magnitude of the correlation, and by multiplying the above gain by the second frequency signal.

As a first frequency shift unit according to the present invention to achieve the aforementioned object, between a first frequency signal and a second frequency signal being input into an echo canceller for suppressing an echo produced by inputting into a microphone a voice signal being output from a speaker, the frequency shift unit for frequency-shifting the above first frequency signal includes: a detection means for detecting a deviation between a first sampling period of a digital-to-analog converter for converting a received first digital voice signal to an analog voice signal, so as to output from the speaker, and a second sampling period of an analog-to-digital converter for converting an analog voice signal being input into the microphone to a second digital voice signal; a conversion means for converting the first digital voice signal to the first frequency signal; and a frequency shift means for frequency-shifting the first frequency signal based on the deviation detected by the detection means, and further, the second frequency signal frequency-converted from the second digital voice signal and the first frequency signal frequency-shifted by the frequency shift means are input into the echo canceller.

Further, as a second frequency shift unit according to the present invention, between a first frequency signal and a second frequency signal being input into an echo canceller for suppressing an echo produced by inputting into a microphone a voice signal being output from a speaker, the frequency shift unit for frequency-shifting the above second frequency signal includes: a detection means for detecting a deviation between a first sampling period of a digital-to-analog converter for converting a received first digital voice signal to an analog voice signal, so as to output from the speaker, and a second sampling period of an analog-to-digital converter for converting an analog voice signal being input into the microphone to a second digital voice signal; a conversion means for frequency-converting the second digital voice signal to the second frequency signal; and a frequency shift means for frequency-shifting the second frequency signal based on the deviation detected by the detection means, and further, the first frequency signal frequency-converted from the first digital voice signal and the second frequency signal frequency-shifted by the frequency shift means are input into the echo canceller.

Effects of the Invention

According to the echo canceller of the present invention, a clock deviation between the speaker side (the receiving side) and the microphone side (the transmitting side) is detected, and based on the above deviation, the first frequency signal (speaker signal (reference signal)) or the second frequency signal (microphone signal) is frequency-shifted in the frequency domain, and therefore, an influence caused by the clock deviation can simply be corrected without causing an increased processing amount, and an echo can be suppressed effectively.

DESCRIPTION OF THE SYMBOLS

Figure 1:
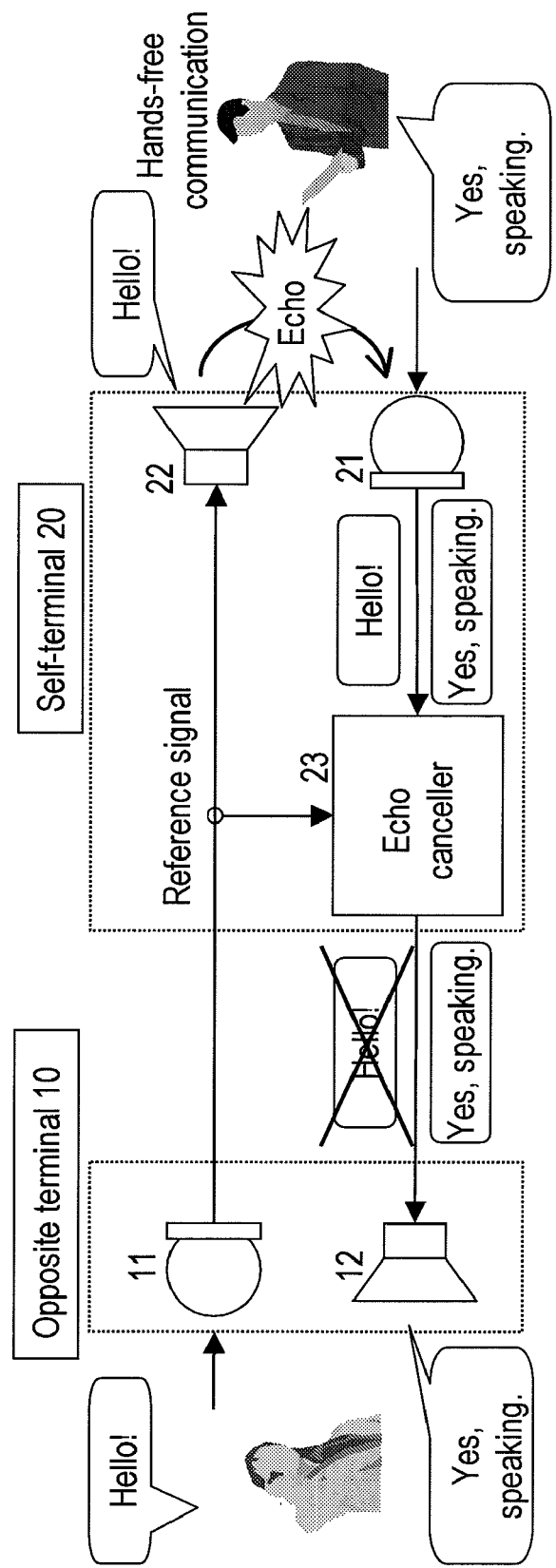
FIG. 1 shows a diagram illustrating hands-free communication.
Figure 2:
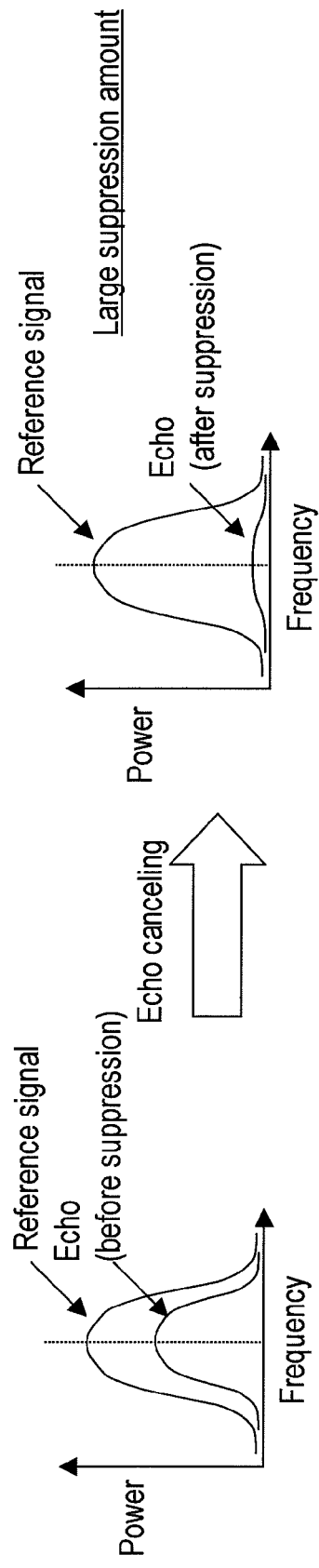
FIG. 2 shows a diagram illustrating the principle of an echo canceller.
Figure 2:
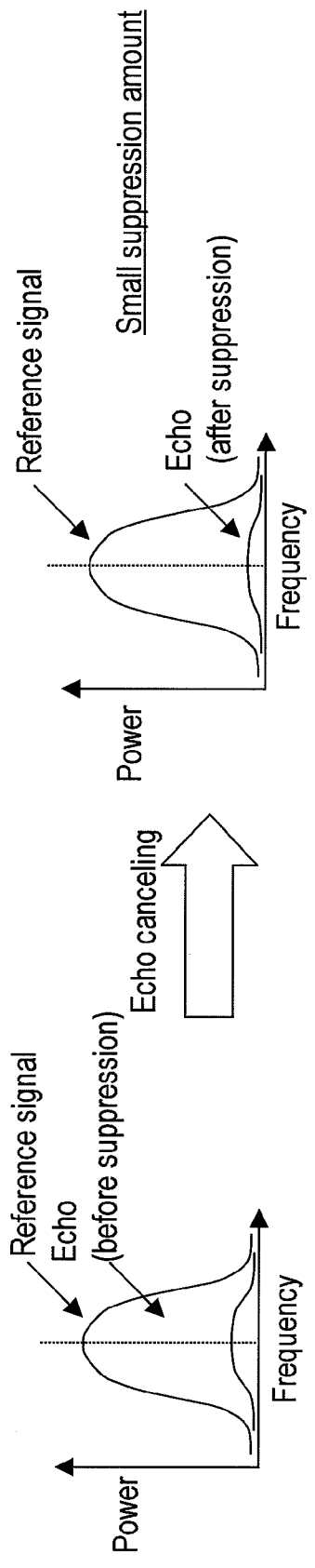
Figure 3:
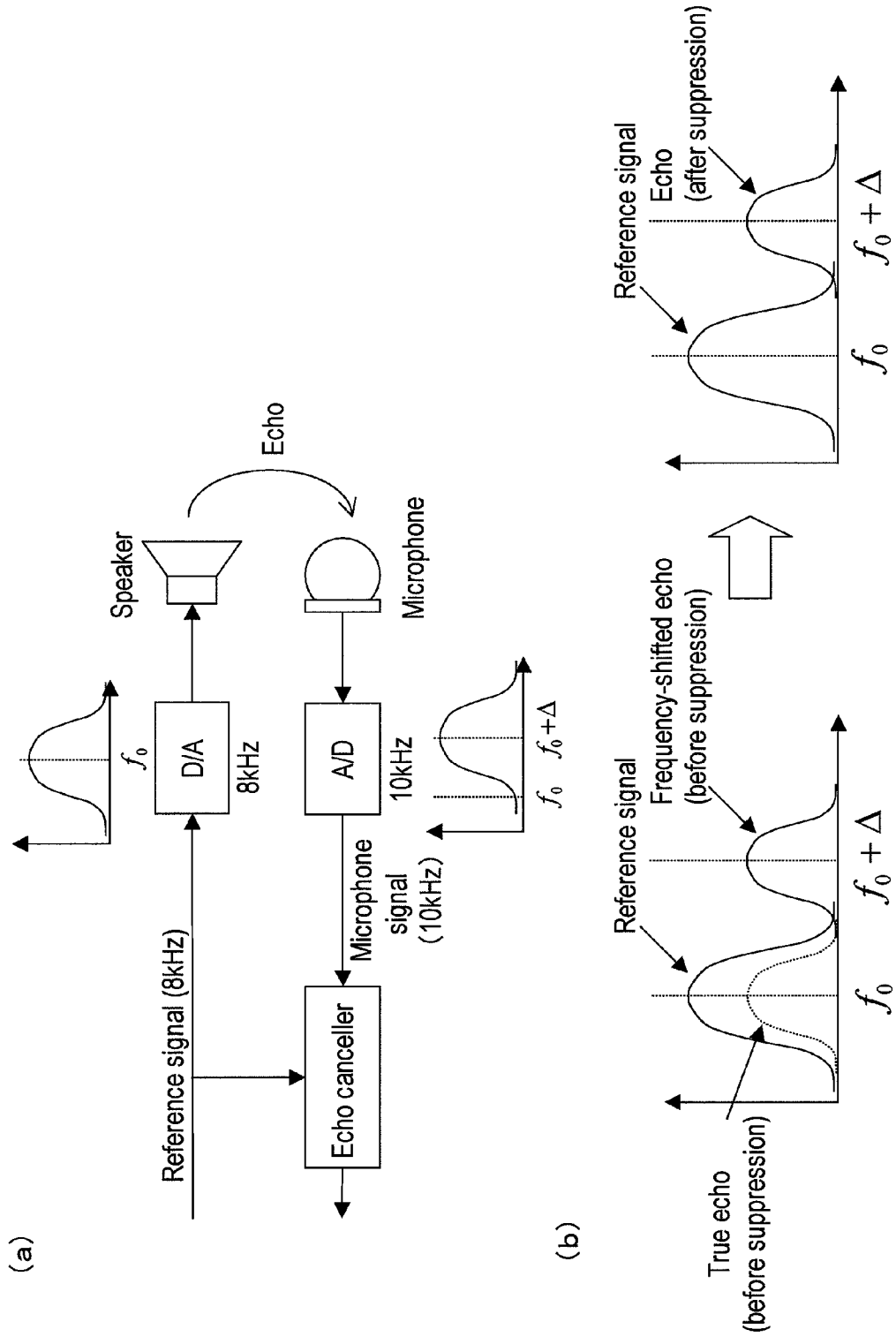
FIG. 3 shows a diagram illustrating a case that an echo is not suppressed because of the deviation of the sampling frequencies.

103: D/A converter, 104: A/D converter, 105: clock deviation detector, 106: FFT, 107: FFT, 108: correlation calculator, 109: frequency shifter, 110: memory, 111: echo estimator, 112: subtractor, 113: inverse FFT, 114: suppression amount calculator, 115: multiplier

PREFERRED EMBODIMENTS OF THE INVENTION

The preferred embodiment of the present invention is described hereinafter referring to the drawings. However, it is noted that the technical scope of the present invention is not limited to the described embodiments.

According to the embodiment of the present invention, an echo is effectively suppressed by detecting the deviation of the clocks (sampling frequencies) between an A/D converter on the microphone side and a D/A converter on the speaker side, and based on the above detection result, shifting the frequency spectrum of either the speaker signal (reference signal) or the microphone signal causing an echo, thereby correcting an effect caused by the clock deviation.

Figure 4:
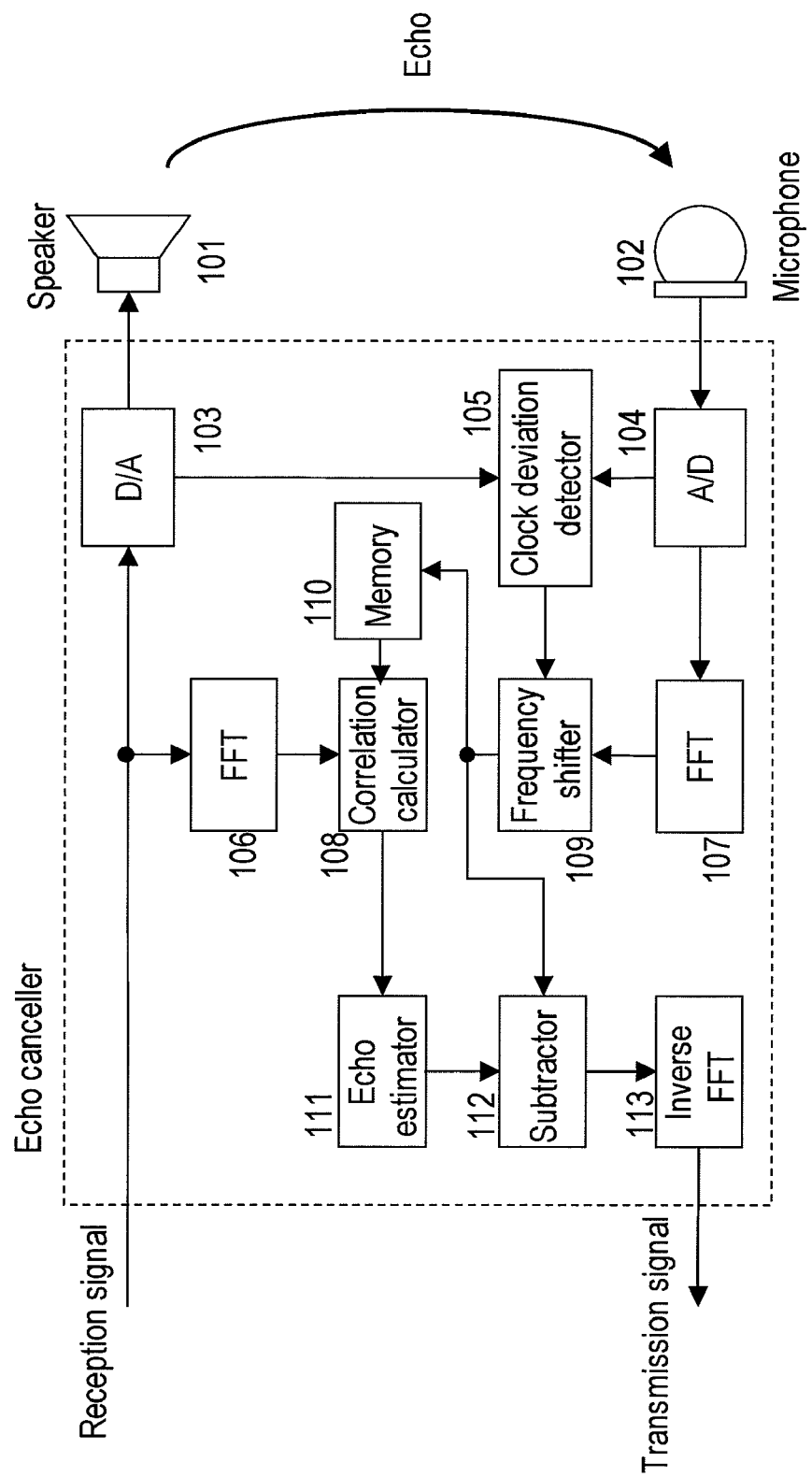
FIG. 4 shows a diagram illustrating a first exemplary configuration of a speech communication device having an echo canceller, according to an embodiment of the present invention.

FIG. 4 is a diagram illustrating a first exemplary configuration of a speech communication device 100 having an echo canceller according to the embodiment of the present invention. The first exemplary configuration shows an example in which the frequency spectrum of the microphone signal is shifted. Here, although the portion surrounded by the dotted lines in the figure indicates a portion corresponding to the echo canceller, it may not be necessary to include a D/A converter 103 and an A/D converter 104 as configuration elements of the echo canceller.

D/A converter 103 in speech communication device 100 converts a voice digital signal (reception signal) from the opposite device into an analog signal, and the analog signal is regenerated and output from speaker 101 as a voice. Also, microphone 102 detects voice, and at that time, microphone 102 collects the voice output from the speaker 101 as an echo. The voice detected by microphone 102 is converted into a digital signal by means of A/D converter 104, and further converted into a frequency signal by means of a Fourier Transformer (FFT) 107.

A clock deviation detector 105 detects a clock deviation in between D/A converter 103 on the speaker side and A/D converter 104 on the microphone side. For example, in case that speech communication device 100 is a device being operated under the control of OS (operation system) of a personal computer, the driver of D/A converter 103 sends a regeneration completion notification to the OS at each clock period. Meanwhile, the driver of A/D converter 104 sends a recording completion notification to the OS at each clock period. By detecting the reception periods of both the above regeneration completion notification and the recording completion notification, clock deviation detector 105 detects the respective clock periods (sampling frequencies) of D/A converter 103 and A/D converter 104, and further detects the clock deviation based on the difference therebetween.

Based on the detected clock deviation, a frequency shifter 109 calculates a frequency deviation of the echo, namely, a shift amount, and shifts a microphone signal (in this case, a frequency signal from FFT 107) by the above shift amount. With this, the frequency deviation between the speaker signal and the echo is corrected, and by means of the processing described later, the echo can be suppressed sufficiently.

A frequency shift amount (frequency deviation) $\Delta$ of the microphone signal including echo can be obtained from the calculation shown below.

[Expression 1]

Let sampling frequency at the time of regeneration: $f_s$ [Hz], echo frequency at the time of regeneration: $f_0$ [Hz], sampling frequency at the time of recording: $f'_s$ [Hz] and echo frequency at the time of recording: $f_0+\Delta$ [Hz], then, the following equation is held.

$$f_s : f_0 = f'_s : f_0 + \Delta \quad (1)$$

By deforming equation (1), $$f_s(f_0 + \Delta) = f_0 f'_s \quad (2)$$

$$f_0 + \Delta = \frac{f_0 f'_s}{f_s} \quad (3)$$

Therefore, the deviation $\Delta$ of the echo frequency can be expressed by the following equation (4).

$$\Delta = \frac{f_0 f'_s}{f_s} - f_0 = f_0 \left( \frac{f'_s}{f_s} - 1 \right) \quad (4)$$

The shifted frequency signal (frequency spectrum) of the microphone signal is once stored in a memory 110, and then input into a correlation calculator 108. Correlation calculator 108 calculates a correlation between the speaker signal (reference signal) and the frequency-shifted microphone signal. Since the correlation calculation is performed in the frequency domain, the speaker signal (reference signal) being frequency-converted in FFT 106 and the microphone signal, being frequency-converted in FFT 107 and then frequency-shifted, are input into correlation calculator 108. Correlation calculator 108 calculates the correlation between both frequency signals, and sends the above correlation to an echo estimator 111.

Among the reference signal spectrum of the past and present frames, echo estimator 111 searches a reference signal spectrum having a maximum correlation with an echo signal spectrum. In the present embodiment, since the correlation calculation and the echo estimation processing are performed for the frequency spectrum in which the frequency deviation of the microphone signal has been corrected, it is possible to estimate a correct frequency spectrum of the echo. Then, a subtractor 112 subtracts the frequency spectrum of the echo above estimated, from the frequency spectrum (microphone signal) fed from frequency shifter 109. With this, the echo can be suppressed correctly. By means of an inverse Fourier transformer (inverse FFT) 113, the output from subtractor 112 is restored to a signal in the time domain, and transmitted to the speech communication device on the opposite party, as a transmission signal (voice digital signal). The calculation processing in correlation calculator 108 and echo estimator 111 will be described later in detail.

Figure 5:
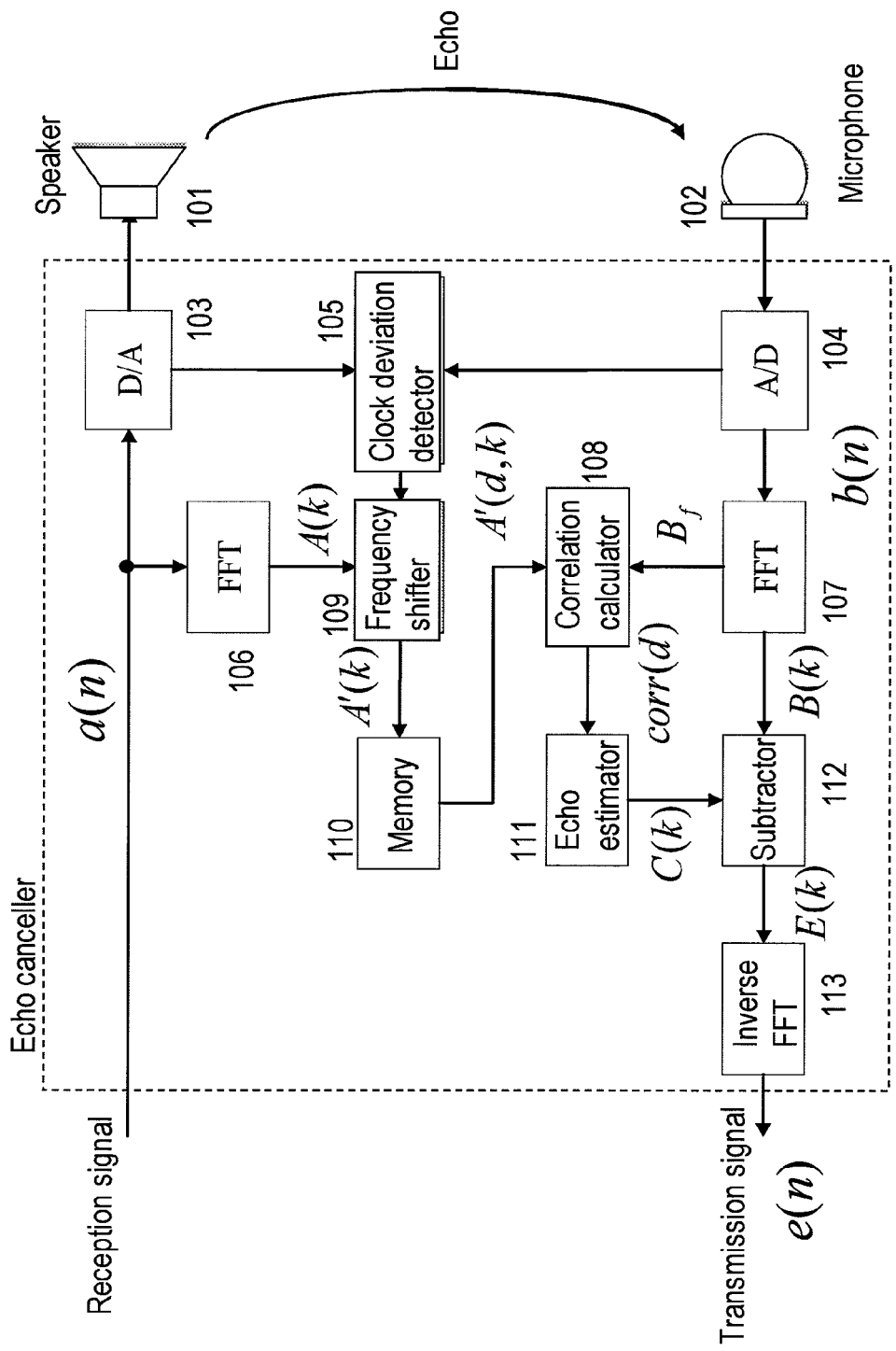
FIG. 5 shows a diagram illustrating a second exemplary configuration of a speech communication device having an echo canceller, according to an embodiment of the present invention.

FIG. 5 is a diagram illustrating a second exemplary configuration of the speech communication device having an echo canceller, according to the embodiment of the present invention. The second exemplary configuration shows an example of shifting the frequency spectrum of the speaker. Namely, while the frequency spectrum of the microphone signal is shifted in the first exemplary configuration, in the second exemplary configuration, a frequency shifter 109 shifts the frequency spectrum of the speaker signal being frequency-converted in FFT 106. Since other configurations are similar to the configuration in the first exemplary configuration, the description of the other configurations is omitted.

Now, using the reference symbols shown in FIG. 5, the calculation processing in correlation calculator 108 and echo estimator 111 will be described.

[Expression 2]

(1) From a complex number $A_f(k) = A_R(k) + jA_I(k)$ which is obtained by Fourier transforming a reference signal a (n), (n=0, ..., N-1), a reference signal spectrum A(k), (k=0,N/2-1) is obtained, using the following formula. N is a frame length.

$$A(k) = \sqrt{A_R(k)^2 + A_I(k)^2}$$

(2) Similarly, by Fourier transforming an echo (microphone) signal b(n), (n=0, ..., N-1), an echo signal spectrum B(k), (k=0, N/2-1) is obtained.

(3) Next, based on the detection result of a clock deviation, the reference signal spectrum is frequency shifted, so as to obtain a frequency-shifted reference signal spectrum A'(k).

(4) A'(k) is stored into a memory, and a past reference signal spectrum A'(d,k) is updated in the following manner. The d is an index indicating the number of delayed frames, d=0 indicates a present frame, and d=−1 indicates a preceding frame by one.

A'(i,k)=A'(i−1,k), (i=M,M−1, ..., 1) (The past reference spectrum is shifted.)

A'(0,k)=A'(k) (The reference signal of the present frame is stored into a 0-th position.)

Here, M is a natural number indicating the maximum value of the number of delayed frames.

(5) By inputting both A'(d,k) and B(k) into a correlation calculator, a correlation corr(d), (d=0, . . . , M) is obtained using the following formula.

$$\text{corr}(d) = \sum_{k=0}^{\frac{N}{2}-1} A'(d, k) \cdot B(k)$$

(6) By inputting corr(d) into an echo estimator, a delay $d_{max}$ producing the maximum correlation corr(d) is determined. In the echo estimator, a reference signal spectrum A'($d_{max}$,k) when d=$d_{max}$, in other words, the preceding reference signal spectrum by $d_{max}$ frames is defined to be a pseudo echo spectrum C(k).

$$C(k)=A'(d_{max},k), (k=0, \ldots, N/2-1)$$

(7) By inputting the microphone signal spectrum B(k) and the pseudo echo spectrum C(k) into a subtractor, an echo-suppressed output signal spectrum E(k)=B(k)−C(k) is obtained.

(8) By inputting E(k) into an inverse Fourier Transformer (inverse FFT), an echo-suppressed output signal e(n) is obtained.

Figure 6:
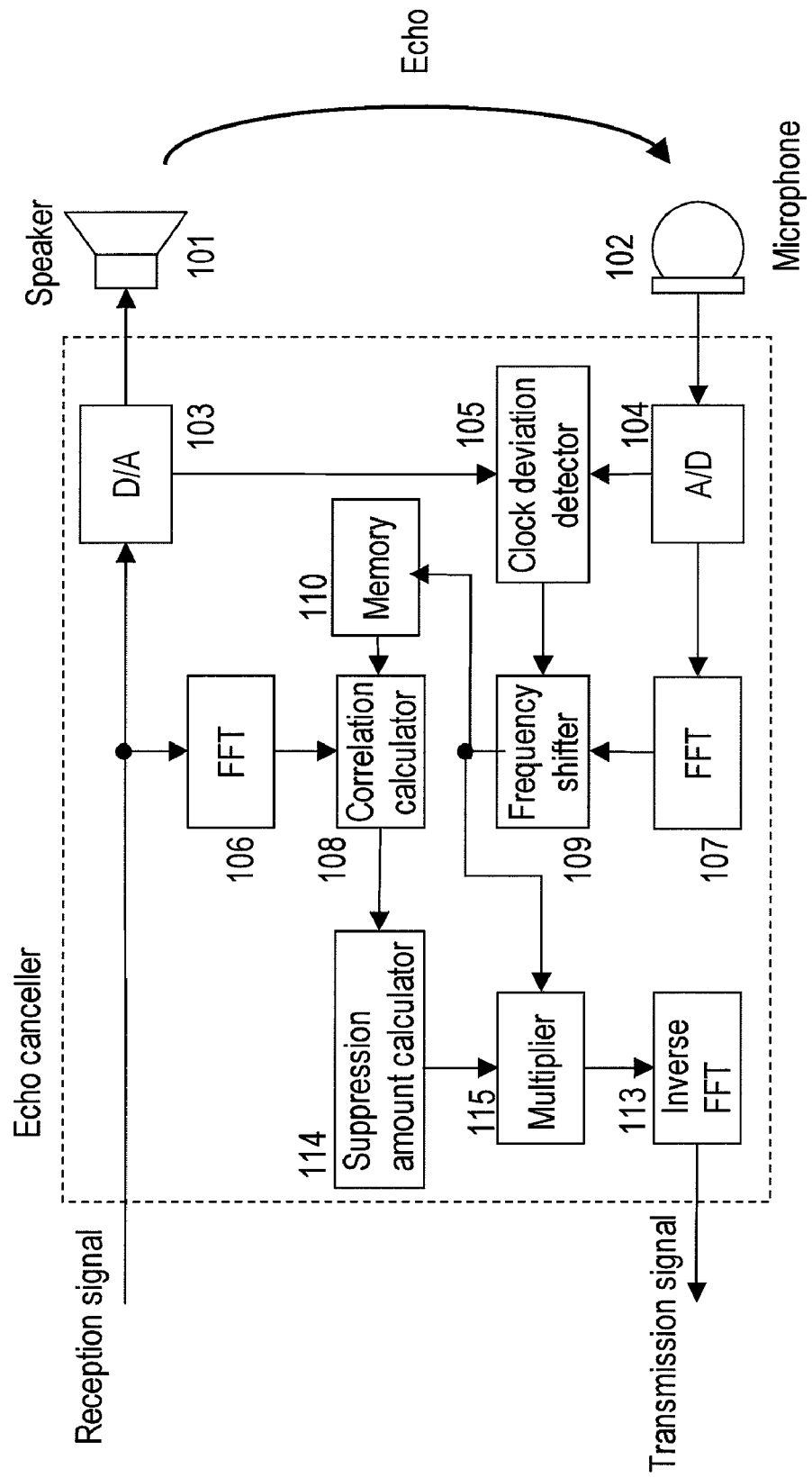
FIG. 6 shows a diagram illustrating a third exemplary configuration of a speech communication device having an echo canceller, according to an embodiment of the present invention.

FIG. 6 is a third exemplary configuration of the speech communication device having an echo canceller according to the embodiment of the present invention. In the third exemplary configuration, although an example of shifting the frequency spectrum of the microphone signal is shown, it is also applicable to a case of shifting the frequency spectrum of the speaker signal (corresponding to the second exemplary configuration).

As compared to the first exemplary configuration, in which echo estimator 111 estimates the frequency spectrum of the echo and subtracts from the microphone signal, based on the calculation result in correlation calculator 108, in the third exemplary configuration, in place of echo estimator 111, a suppression amount calculator 114 calculates the gain (suppression amount) of the microphone signal based on the calculation result in correlation calculator 108, and a multiplier 115 replaced from subtractor 112 multiplies the above gain by the microphone signal, thereby suppressing the echo. Specifically, by increasing the gain more as the correlation is larger, it becomes possible to effectively attenuate the echo. Other configurations than the above are similar to the first exemplary configuration or the second exemplary configuration, and therefore, the description thereof is omitted.

Figure 7:
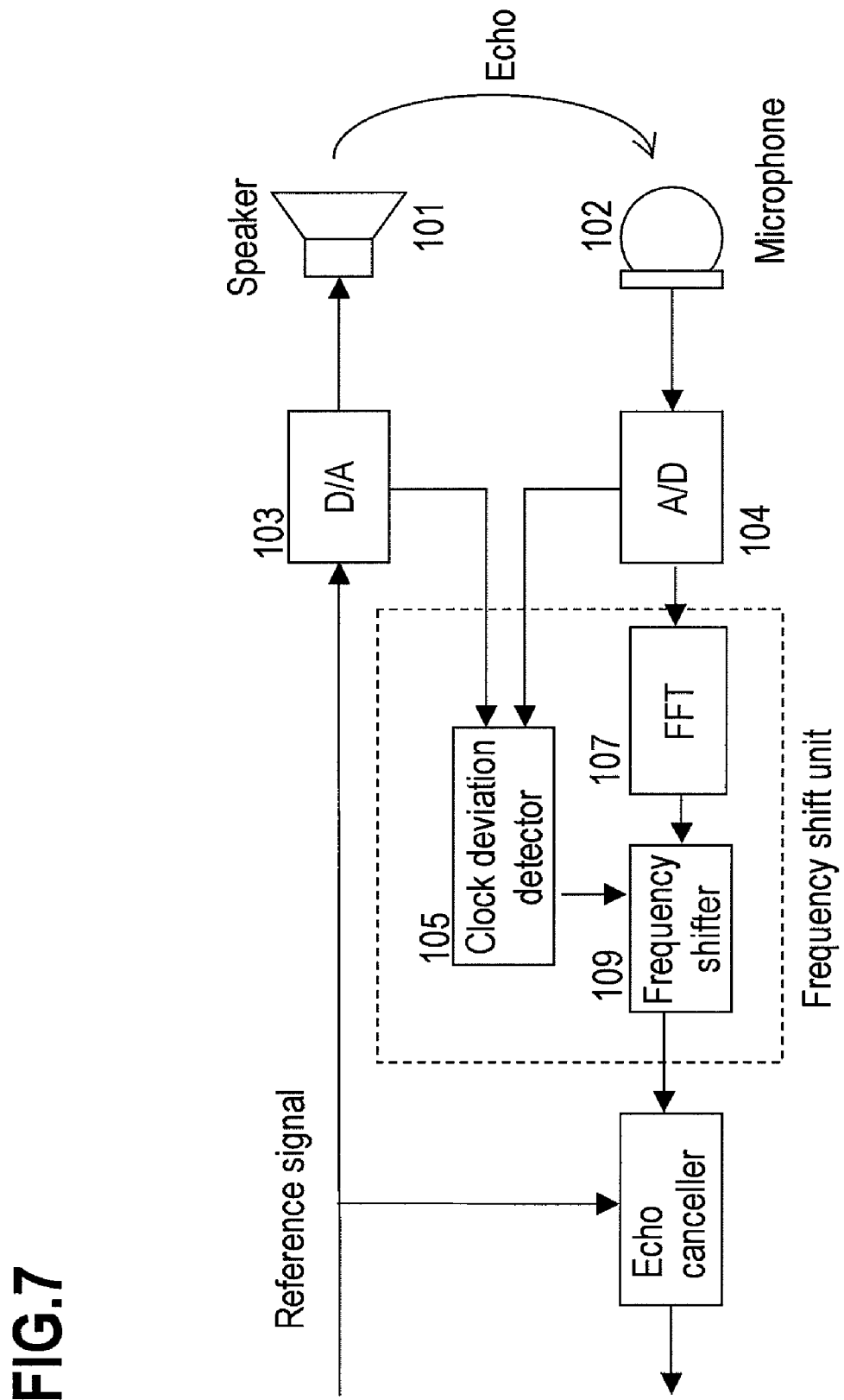
FIG. 7 shows a diagram illustrating a fourth exemplary configuration of a speech communication device having an echo canceller, according to an embodiment of the present invention.

FIG. 7 is a fourth exemplary configuration of the embodiment of the present invention. The fourth exemplary configuration is a frequency shift unit, including clock deviation detector 105, FFT 107 and frequency shifter 109 in each exemplary configuration described above, and the frequency shift unit is disposed inside the speech communication device, independently of the echo canceller. The configuration shown in the figure shows an example of shifting the frequency spectrum of the microphone signal (corresponding to the first exemplary configuration), but it is also applicable to a case of shifting the frequency spectrum of the speaker signal (corresponding to the second exemplary configuration).

As such, according to the embodiments of the present invention, the echo is suppressed in the frequency domain. Namely, only by shifting the frequency spectrum of the frequency-converted microphone signal or the reference signal (speaker signal) to a frequency direction, it is possible to correct the frequency spectrum of the echo, which can be realized with a small processing amount, and with simple processing. Particularly, as in the present embodiments, because it is not necessary to newly obtain the frequency spectra of the microphone signal and the reference signal when performing echo suppression in the frequency domain, an increase of the processing amount is remarkably small.

INDUSTRIAL APPLICABILITY

It is possible to effectively suppress an echo which is produced in a speech communication device, capable of bidirectional communication, including a D/A converter on the speaker side and an A/D converter on the microphone side having different clocks.

What is claimed is:

1. An echo canceller for suppressing an echo produced by inputting into a microphone a voice signal being output from a speaker, comprising:
   detection means for detecting a deviation between a first sampling period of a digital-to-analog converter for converting a received first digital voice signal to an analog voice signal, so as to output from the speaker, and a second sampling period of an analog-to-digital converter for converting an analog voice signal being input into the microphone to a second digital voice signal;
   first conversion means for frequency-converting the first digital voice signal to a first frequency signal;
   second conversion means for converting the second digital voice signal to a second frequency signal;
   frequency shift means for uniformly frequency-shifting a whole frequency spectrum of the first frequency signal by a frequency width based on the deviation detected by the detection means;
   correlation calculation means for obtaining a correlation between the second frequency signal and the first frequency signal frequency-shifted by the frequency shift means; and
   echo suppression means for suppressing the echo included in the second frequency signal, based on said correlation.

2. The echo canceller according to claim 1,
   wherein the echo suppression means suppresses the echo by estimating the frequency spectrum of the echo based on the correlation, and by subtracting the frequency spectrum of the echo from the second frequency signal.

3. The echo canceller according to claim 1,
   wherein the echo suppression means suppresses the echo by obtaining a gain corresponding to the suppression amount of the echo based on the magnitude of the correlation, and by multiplying said gain by the second frequency signal.

4. An echo canceller for suppressing an echo produced by inputting into a microphone a voice signal being output from a speaker, comprising:
   detection means for detecting a deviation between a first sampling period of a digital-to-analog converter for converting a received first digital voice signal to an analog voice signal, so as to output from the speaker, and a second sampling period of an analog-to-digital converter for converting an analog voice signal being input into the microphone to a second digital voice signal;
   first conversion means for converting the first digital voice signal to a first frequency signal;
   second conversion means for converting the second digital voice signal to a second frequency signal;

frequency shift means for uniformly frequency-shifting a whole frequency spectrum of the second frequency signal by a frequency width based on the deviation detected by the detection means;

correlation calculation means for obtaining a correlation between the first frequency signal and the second frequency signal frequency-shifted by the frequency shift means; and echo suppression means for suppressing the echo included in the second frequency signal, based on said correlation.

5. A frequency shift unit included in an echo canceller for frequency-shifting a first frequency signal, said first frequency signal and a second frequency signal being input into the echo canceller for suppressing an echo produced by inputting into a microphone a voice signal being output from a speaker, comprising:

detection means for detecting a deviation between a first sampling period of a digital-to-analog converter for converting a received first digital voice signal to an analog voice signal, so as to output from the speaker, and a second sampling period of an analog-to-digital converter for converting an analog voice signal being input into the microphone to a second digital voice signal;

conversion means for frequency-converting the first digital voice signal to the first frequency signal; and frequency shift means for uniformly frequency-shifting a whole frequency spectrum of the first frequency signal by a frequency width based on the deviation detected by the detection means;

wherein the second frequency signal frequency-converted from the second digital voice signal and the first frequency signal frequency-shifted by the frequency shift means are input into the echo canceller.

6. A frequency shift unit included in an echo canceller for frequency-shifting a second frequency signal, a first frequency signal and said second frequency signal being input into the echo canceller for suppressing an echo produced by inputting into a microphone a voice signal being output from a speaker, comprising:

detection means for detecting a deviation between a first sampling period of a digital-to-analog converter for converting a received first digital voice signal to an analog voice signal, so as to output from the speaker, and a second sampling period of an analog-to-digital converter for converting an analog voice signal being input into the microphone to a second digital voice signal;

conversion means for frequency-converting the second digital voice signal to the second frequency signal; and frequency shift means for uniformly frequency-shifting a whole frequency spectrum of the second frequency signal by a frequency width based on the deviation detected by the detection means;

wherein the first frequency signal frequency-converted from the first digital voice signal and the second frequency signal frequency-shifted by the frequency shift means are input into the echo canceller.

* * * * *